United States Patent [19]
Hurd

[11] 3,889,386
[45] June 17, 1975

[54] METHOD AND APPARATUS FOR OUTDOOR POSITION LOCATING INCLUDING DEVELOPMENT OF AN AREA MAP BY RELATIVE BEARINGS OF VISIBLE LANDMARKS

[76] Inventor: Leslie A. Hurd, 2616 Columbus, Muskogee, Okla. 74401

[22] Filed: Mar. 6, 1974

[21] Appl. No.: 448,784

Related U.S. Application Data

[63] Continuation-in-part of Ser. No. 341,802, March 16, 1973, abandoned.

[52] U.S. Cl. .................................................. 33/228
[51] Int. Cl.² ........................................ G01C 15/00
[58] Field of Search ....................... 33/228, 274, 277

[56] References Cited
UNITED STATES PATENTS

| | | | |
|---|---|---|---|
| 356,503 | 1/1887 | Rittenhouse | 33/274 |
| 1,027,855 | 5/1912 | Knapp | 33/274 |
| 2,189,964 | 2/1940 | Sealey | 33/277 |
| 2,677,183 | 5/1954 | Brenner | 33/274 |
| 3,373,429 | 3/1968 | Anderson | 33/274 |

OTHER PUBLICATIONS
Robinson, *Surveying and Navigation*, Ernst, Cincinnati, 1857, pp. 146–152 (Scientific Library).

*Primary Examiner*—Richard E. Aegerter
*Assistant Examiner*—Richard R. Stearns
*Attorney, Agent, or Firm*—David H. Semmes

[57] ABSTRACT

Method and apparatus for locating an outdoor position and determining course and distance therefrom to another position, including, in a field area, determining and making as a fix at the center of a circular chart marked off in square miles and girded by a 360° protractor of a first known base position with the exact direction and location of landmarks therefrom plotted, determining and plotting a second known fixed position a predetermined distance and direction from the first position, with the exact location and direction of the same landmarks therefrom plotted on the chart to fix all relative positions and thereby develop an area map, and apparatus usable for field readings on the established and plotted landmarks from a position remote from a base camp position for plotting a new field position on the map whereby a user can pinpoint such remote position, and determine courses and distances from the remote position to a second desired position on the map or to the base camp.

3 Claims, 4 Drawing Figures

PATENTED JUN 17 1975　　　3,889,386

METHOD AND APPARATUS FOR OUTDOOR POSITION LOCATING INCLUDING DEVELOPMENT OF AN AREA MAP BY RELATIVE BEARINGS OF VISIBLE LANDMARKS

RELATED APPLICATIONS

This is a continuation-in-part of copending application Ser. No. 341,802, filed Mar. 16, 1973, entitled METHOD AND APPARATUS OF OUTDOOR POSITION LOCATING, now abandoned, which said application continued in Ser. No. 447,428, now U.S. Pat. No. 3,858,326.

BACKGROUND OF THE INVENTION

A need exists for a method and equipment for a simple, practical and functional system which can be operated by unskilled persons in a field area, such as hunting and fishing, to be able to determine a field position in any area by merely obtaining relative bearing or degree lines from a plurality of visible landmarks for plotting on a pre-established field map and without the necessity for complicated field adjustments or computations. The present invention teaches development of an area map by relative bearings of visible landmarks and the utilization of a so created area map to permit, by subsequent relative bearings of same visible landmarks and plotting of the same, to establish by reference to the map an unknown field position. The plotting of the unknown field position on the map thereafter permits the user to determine a subsequent direction of travel and distance to a subsequent field position or a return to a base camp position. The map facilitates not only a distance determination but also the direction of travel to follow.

The foregoing and other objects and advantages of the invention will be more readily apparent from the following detailed description of an embodiment thereof when taken together with the accompanying drawings in which.

Figure 1:
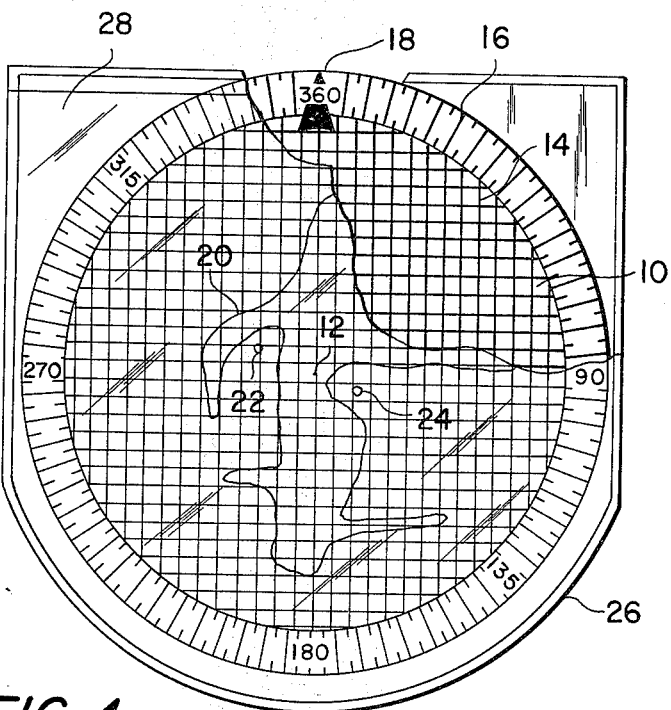
FIG. 1 is a plan view of an area map utilizable as a field map in accordance with the invention, revealing relative size adapted for pocket use and with a protective jacket.

Referring now in greater detail to the drawings, a disc shaped map of a small pocket size is indicated at 10, which may consist in a chart having a center point 12 to serve as the exact center of a camp or basing point in a field with distances marked off in square miles as at 14 by gridlike lines from the center point and preferably on an eighth inch scale to show square miles. The chart is girded by a 360° protractor 16 with a 0 or 360° indicator arrow 18 for use as a reference. This map, in the nature of a chart, can be otherwise blank for use in any geographic location where a user might be. In the embodiment shown in FIG. 1, the field area includes, for example, a schematic depiction at 20 of an area lake, the outline of which is shown and previously placed on the map as by printing. Additionally, known landmarks such as lighted towers or the like can be indicated on the map as at 22 and 24, which in many instances have been erected to facilitate navigation or the like in field areas.

A pocket case 26 is adapted for carrying the chart or map, and a transparent cover 28 permits viewing of the face of the map within the case.

While not necessary to the invention, the superimposing of reduced scale maps of lakes of the like on the circular charts or maps of the invention with the lake placed in relative position from the center of the map and showing the exact position of light towers or the like will facilitate use of the invention so that during night or day field operations utilizing the teachings of the invention, a user can spot and place any desired camp site or position on the map and be able to chart a course back to camp from any island or shoreline on the lake, for example. In the absence of this information, the map is usable as will appear hereinafter as designed from and including relative positions of base camps and angularly spaced distant landmarks.

Figure 2:
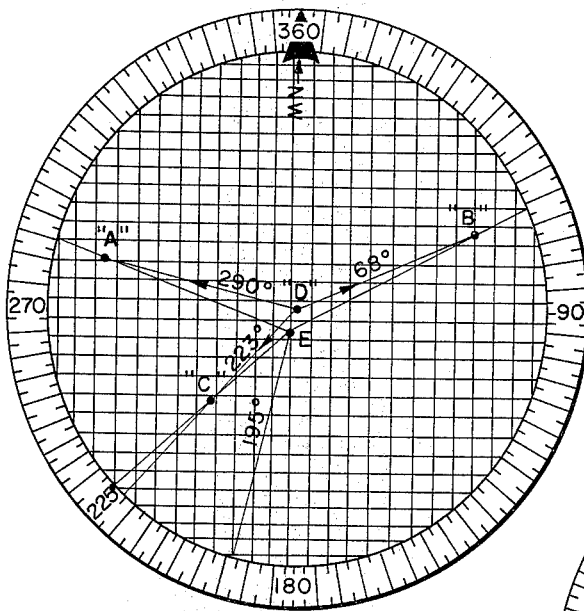
FIG. 2 is a view of the map of FIG. 1, showing establishment of fixed points and relative bearings therefrom to visible landmarks for fixing of relative positions on the map.

In practicing the invention, it is to be understood that magnetic North, indicated M.N. on the chart of FIG. 2 is a variable factor according to time and place but is a fixed factor at a given time and place. Therefore, in order to simplify the functions to be used, always use M.N. as 360° in determining the relative direction and position of the landmarks in the area and to pinpoint a user's position in the field. If a secluded camp site does not offer a wide perspectus of the landmarks, then it may be necessary to move to a nearby site where better results can be obtained and this tis site the center basing point 12 and mark the camp position at 12 on the map.

Figure 4:
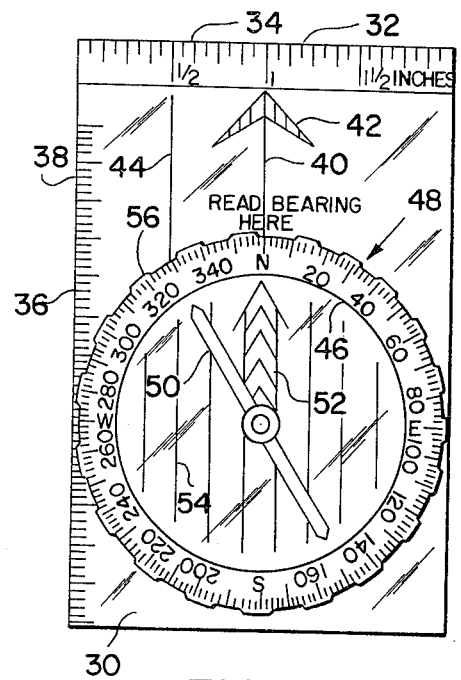
FIG. 4 is a plan view of a swivel type compass employed in taking and establishing and plotting of relative bearings of landmarks and for measurement of distances when utilizing the established maps.

Basic equipment for field operation should include material, such as a pencil, water-tight match box, a small flashlight, a compass, such as shown in FIG. 4, and a copy of a map, such as shown in FIGS. 1 and 2. The compass as shown in a Silva System compass Type 342, distributed by Silva, Inc. of LaPorte, Indiana, and which includes a transparent face 30 having along one beveled edge thereof 32 distance markings 34 and along a second side 36 an additional scale 38. The scale markings 34 can be in inches as shown, and the markings 38 can be in millimeters. A base direction line is printed at 40 with an indicator arrowhead 42 utilized for orienting of the base plate and a second direction indicator line 44 is also included. A collar 46 is mounted on the base which serves in conjunction with a rotatable compass housing 48 to mount in a liquid filled nature a magnetic needle 50. The compass housing includes an orienting arrow 52 and orienting lines 54 as also a compass card 56 in a usual manner. This compass housing being rotatable with respect to the base serves a very important function as will appear hereinafter. The side edges with their scales thereon can be used for measurement of distances, as also for plotting of lines as also will appear hereinafter for plotting relative bearings from landmarks.

Use of these components in the field is extremely simple. Referring to FIG. 2, from base point D take degree readings utilizing the compass to visible landmarks A, B and C and project these lines outward as shown on the chart together with the relative bearing with the compass and chart properly oriented. A fix point E is then established by placing markers 46 feet apart at base D and moving outward at a fixed degree line to a point where these markers show to be exactly one degree apart, which will be one mile distance from the camp. This one mile distance could also be determined by using properly spaced reticles in a scope, for example. From this fix point E, again project degree lines outward to these same landmarks and then pinpoint the point of juncture of the two sets of degree lines, which will be the exact positions of the landmarks on the map. Using the side edge 36 of the compass base to draw in the lines on the map and the eighth inch scale 34 on front end 32, the mile distances can be measured when on the bias from the grid plate on the face of the map. These landmarks should be perforated on the map and recorded on the back for future reference.

Figure 3:
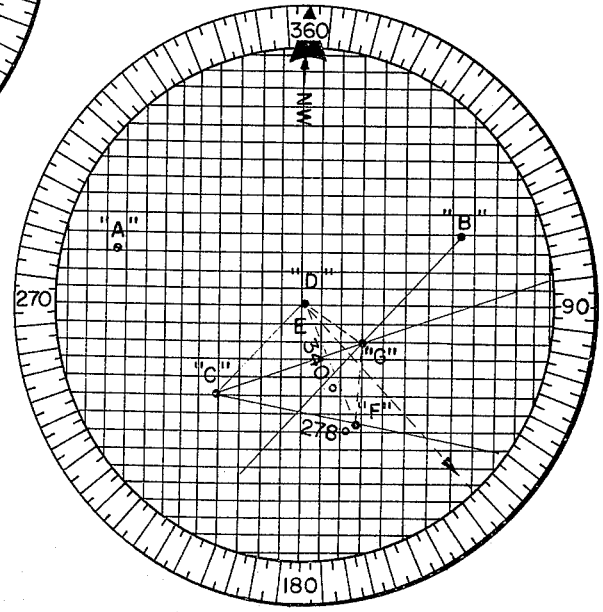
FIG. 3 is a view of the map having thereon routes and distances covered by a user plotted thereon.

In field use, the time of departure from point D should be written on the map, as also the route to be covered as shown in broken lines to be 135°. Should the user meander off the desired course to point F, for example, and C is the only landmark in view, a reverse degree reading is taken, i.e., 278 − 180 = 98, and project this line on the map, then place a marker and take off at a right angle course counting the user's paces until C bearing will read 277° and for every 15 paces taken will represent 1 mile from C to the marker placed, which in this instance was 8 miles. This is measured off on a C to F projection and will constitute the approximate position F from which a new course can be set to base and measure the distance. As soon as two landmarks become visible the field position is reaffirmed by projecting reverse degree lines to the position which on the map in FIG. 3 would be at G.

Signal towers with night lights of course make the best landmarks. When due to the elements landmarks become invisible, a return course is charted on a reverse degree which on the map of FIG. 3 would be 315°, i.e., 135+180, and this course should be followed for about the time of outward travel, which establishes an approximate position. If lost, a standard three shot signal can be fired, for example, or a fire built and the user should remain until the atmosphere clears or assistance arrives. Adherence to such a procedure will greatly minimize problems in conducting a search for a user.

Accuracy in determining degree readings in the field can be enhanced by zeroing a gun scope on an object with the gun at dead rest and the side of the swivel base of the compass snugly fitting against the side of the gun. Then holding the compass base rigidly in place and moving the rifle out of magnetic range, turn the swivel compass to 360° and the pointer marker will show the degree bearing on the object.

When utilizing the present invention, it is possible for a user to go into an area and develop a map of the local area by the relative degree position of landmarks which may be miles outside of the area to be mapped and no running of any lines in the field are required. When operating in wilderness areas, some landmarks can well be 25 miles away and when, for example, on lakes that are often 50 miles long, the present system permits creation of the area map and utilization to determine relative positions of a user in the area. The field equipment, which consists of only the pocket size circular map with protractor rim and the compass permits using the 360° mark as Magnetic North to determine field position in any area on Earth by merely projecting degree lines and without any field adjustments or computations.

The equipment and system, when used as described above, is sufficiently accurate to direct a user back within sight of a base camp or to another desired point within the so mapped area.

Manifestly, minor details can be effected within the scope of the disclosure without departing from the spirit and scope of the invention as defined in and limited solely by the appended claims.

I claim:

1. The method of establishing outdoor locations by plotting relatively known positions on a chart, together with the relative positions of surrounding landmarks to create a map with fixed locations thereon and determining another position or course and distance therefrom to another position on the map, comprising:

A. establishing as a base a first field outdoor location and plotting the position thereof as a first fixed position on a circular chart, having thereon distance coordinates and a cooperative 360° protractor with angular bearing markings;

B. sighting the angular disposition of a plurality of distant landmarks from and with respect to said base location, and plotting the sighted angles as projected lines of position on the chart to establish by a fix of the lines of position on the chart the base location and relative angular disposition of said landmarks;

C. establishing a second fixed field outdoor location at a known pre-determined distance and direction from said first fixed location, and plotting the so established second fixed field location on said circular chart, wherein the second fixed field outdoor location is established by placing markers 46 feet apart at said first fixed location and moving outwardly, in a direction which is both perpendicular to a line connecting said markers and along a line of fixed degree, to a third point where these markers show to be exactly one degree apart, said third point thereby being known to be one mile distant from said first location.

D. determining angular bearings from said second fixed location to at least two of the same said distant landmarks;

E. plotting the so last determined respective angular bearings from the distant landmarks to said second fixed location as projected lines therefrom on the chart;

F. plotting as fixes at the intersections of the lines from the two respective fixed locations to the respective landmarks the locations of the landmarks on the chart which thereupon constitutes a map; and G. determining from the map the direction and distance to a desired position on the map.

2. The method of claim 1 including determining at an unknown field location remote from both said fixed locations angular bearings respectively of some of the same said landmarks and plotting said last determined angular bearings of said landmarks as projected lines on the map to thereby establish therefrom as a fix at the intersection thereof the position on the map of the unknown remote field location and determining from the map the direction and distance to a desired position on the map from the remote unknown field location.

3. The method of claim 1 including, if after having followed a desired course on the map and, subsequent to following said course, not having arrived at a predetermined position and, further, finding only a single landmark being visible, the method then including the further steps of taking a reverse degree reading, to said landmark plotting a line representing said degree reading from said landmark on said map, placing a marker at your position in the field, taking off on a course which is at a right angle to a line connecting said landmark and said marker, counting paces until a bearing to said single visible landmark reads one degree different from said reverse degree reading, wherein every fifteen paces so counted while on said right angle course represents a single mile for the distance of said landmark point to said marker, taking this found distance and measuring it on said map along said plotted reverse degree reading line, thereby defining on said map a new known position from which a new course to said base can then be determined.

* * * * *